United States Patent [19]

Payne

[11] Patent Number: 4,962,674

[45] Date of Patent: Oct. 16, 1990

[54] SAFETY DEVICE

[76] Inventor: John C. Payne, F. J. Payne and Son Limited, Stanton Harcourt Road, Eynsham, Oxford, United Kingdom, OX8 1JT

[21] Appl. No.: 214,327

[22] Filed: Jul. 1, 1988

[30] Foreign Application Priority Data

Jul. 3, 1987 [GB] United Kingdom ............. 8715644

[51] Int. Cl.$^5$ .................. F16H 25/24; F16D 63/00
[52] U.S. Cl. ......................... 74/89.15; 74/424.8 R; 74/459; 187/25; 188/67; 254/98
[58] Field of Search ............. 74/459, 424.8 R, 89.15; 188/67, 74, 134; 187/25; 254/98

[56] References Cited

U.S. PATENT DOCUMENTS

| | | | |
|---|---|---|---|
| 2,758,485 | 8/1956 | Jahnel | 74/424.8 R |
| 2,875,631 | 3/1959 | Syring | 74/424.8 R |
| 3,304,794 | 2/1967 | Bird | 74/459 |
| 3,502,358 | 3/1970 | Alspaugh et al. | 188/67 |
| 4,074,585 | 2/1978 | Richaud et al. | 74/459 |
| 4,669,943 | 6/1987 | Zamotin | 254/98 |

FOREIGN PATENT DOCUMENTS

| | | |
|---|---|---|
| 578811 | 10/1924 | France . |
| 1110210 | 2/1956 | France . |
| 652199 | 4/1951 | United Kingdom . |

Primary Examiner—Allan D. Herrmann
Attorney, Agent, or Firm—Davis, Bujold & Streck

[57] ABSTRACT

A normally helically interacting shaft and nut assembly having a common longitudinal axis along which the nut is normally displaced linearly by rotation of the shaft is provided with a wedging surface in a passage, located by or in the nut, inclined at an angle to the longitudinal axis and facing into an aperture in the nut normally partially occupied by a threaded portion of the shaft; and a detent, such as a ball, in the passage. In the event of failure of the normal engagement between nut and shaft (such as can occur with the threads on the nut wearing) free relative linear motion of the nut relative to the threaded shaft causes the wedging surface to displace the detent towards, and into engagement with, the threaded shaft and thereafter maintain the detent in such engagement so as to inhibit further free linear motion by the nut relative to the shaft. At least a part of the nut engaging with the shaft can be of a self lubricating material such as a graphite loaded plastics material.

8 Claims, 4 Drawing Sheets

SAFETY DEVICE

This invention relates to a safety device and is particularly concerned with the safe operation of an interacting shaft and nut assembly.

Such assemblies are extensively used in a wide range of applications. One application includes a lifting device where a shaft is rotated to drive an interacting nut to cause components coupled to the nut to rise or fall. If, as is usually the case, the nut is made of softer material than the shaft then the nut will wear more rapidly in use than the shaft. The rate of wear will depend on a number of factors and failure of the nut is not readily anticipated. Inspection will be effective if carried out at regular intervals. However there are applications where regardless of the effectiveness of any operational check there is a need to ensure that in the event of a nut ceasing to engage its shaft a component driven by the nut will not fall uncontrollably. A typical such application would be an invalid lifting device made up of a vertical column on which is carried one end of a horizontal arm. The end of the arm remote from the column has a hook or other means for engaging a chair for an invalid. The column is made up of telescopic sections and houses a threaded shaft on which is mounted a nut which supports the uppermost telescopic section of the column which serves to support the arm. Rotation of the nut results in raising or lowering of the section relative to the rest of the column and so the raising or lowering of the arm.

According to a first aspect of the present invention there is provided a normally helically interacting shaft and nut assembly having a common longitudinal axis along which the nut can be displaced linearly by rotation of the shaft; characterised by a wedging passage, located by or in the nut, inclined at an angle to the longitudinal axis and facing into an aperture in the nut normally partially occupied by a threaded portion of the shaft; and a detent, such as a ball, in the passage; the detent normally being loosely located: in a direction parallel to the longitudinal axis by way of the shaft and in a direction transverse the axis and radially furthest therefrom by the wedging passage and radially nearest thereto by the shaft. In the event of free relative linear motion of the nut relative to the threaded shaft occurring due to failure of the normal helical interaction between nut and shaft the force causing the linear motion of the nut relative to the shaft causes the wedging passage to displace the detent towards, and into engagement with, the threaded shaft and thereafter, for as long as a force continues to act to cause linear displacement of the nut relative to the shaft, maintain the detent in such engagement so as to inhibit further free linear motion by the nut relative to the shaft.

According to a first preferred form of the first aspect of the present invention the normal helical interaction is provided by complementary threaded portions provided on the nut and on the shaft which portions are in sliding contact with one another.

According to an alternative preferred form of the first aspect of the present invention the normal helical interaction is provided by complementary threaded portions provided on the nut and on the shaft which portions engage one another indirectly by way of an intermediate discrete member or series of discrete members such as a plurality of balls.

According to a further preferred form of the first aspect of the present invention or the first or alternative preferred forms thereof the nut is in two discrete but connected parts; the first part containing at least some of the complementary threaded portion of the nut and the second part containing the passage and detent. Typically the first part of the nut, or at least the complementary threaded portion of it, is of a self lubricating material such as a graphite loaded plastics material.

According to a second aspect of the present invention there is provided for a normally helically interacting shaft and nut assembly having a common longitudinal axis along which the nut can be displaced linearly by rotation of the shaft a method of limiting free linear motion of the nut relative to the shaft comprising the steps of:

(a) providing a passage including a wedging surface in the nut at least the surface being inclined at an angle to the longitudinal axis and opening into a space normally occupied by a portion of the threaded shaft;

(b) providing a detent in the passage loosely located: in a direction parallel to the longitudinal axis by way of the shaft; and in a direction transverse the longitudinal axis radially outwardly by the surface and radially inwardly by the shaft; and, in the event of free relative linear motion by the nut relative to the threaded shaft;

(c) causing the surface to displace the detent towards, and into engagement with, the threaded shaft so engaging the nut with the threaded shaft and thereafter, for as long as a force acts to displace the nut linearly relative to the shaft;

(d) maintaining the detent in engagement with the shaft to inhibit further free linear motion of the nut relative to the shaft.

An exemplary embodiment of the invention will now be described with reference to the accompanying drawings of which:

Figure 1:
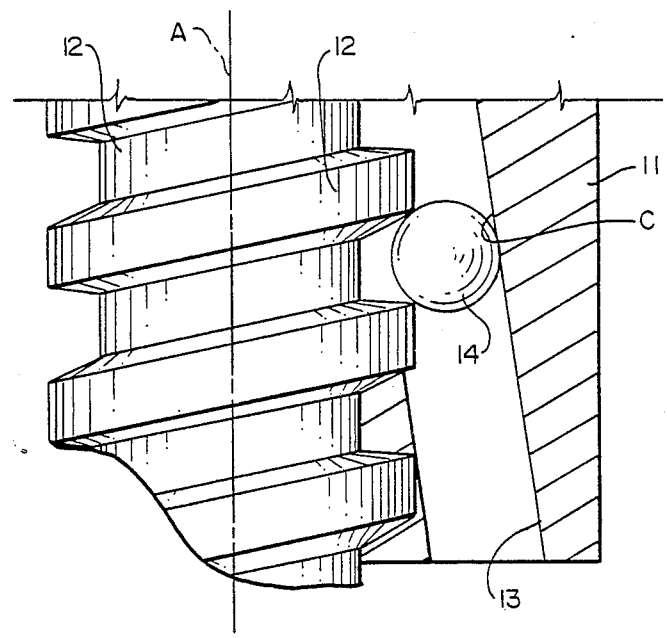
FIGS. 1 and 2 are longitudinal sections of a first embodiment of a threaded shaft and nut assembly where for convenience the left hand and right hand halves of the drawing are divided by longitudinal axis A of the assembly and show components in different working positions.
Figure 2:
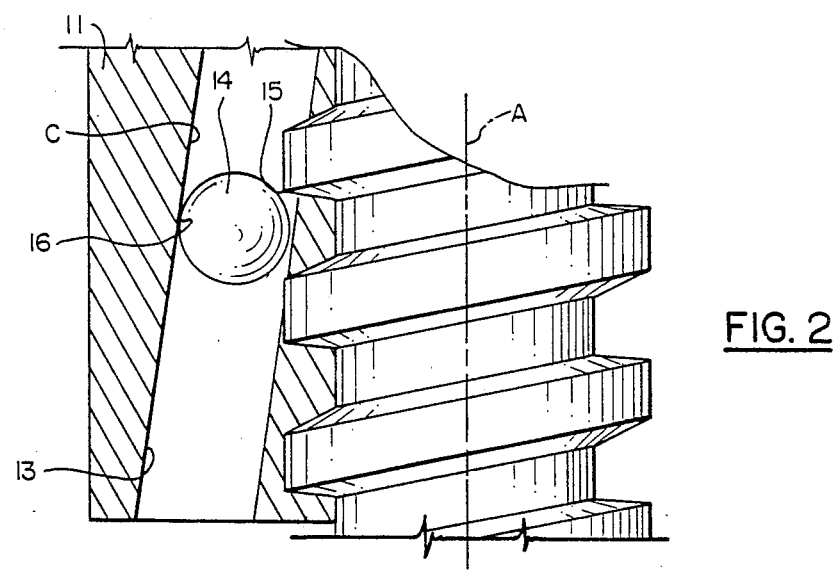

FIGS. 1 and 2 show an assembly made up of a nut 11 screwed onto a threaded shaft 12. In this case the threaded shaft 12 is cut with an acme thread having a characteristic flat top to both the top and bottom of the thread form. The nut 11 serves to support an arm whereby a chair for supporting an invalid can be raised and lowered by an occupant of the chair or by an attendant by way of a manually operated crank which serves to rotate the shaft 12. A passage 13 houses a detent in the form of a hardened steel ball 14.

In FIG. 1 the nut 11 is shown in a relatively unworn condition and the ball 14 rides in passage 13 which is inclined at an angle to longitudinal axis A of threaded shaft 12. The passage 13 opens into an aperture normally occupied by the shaft 12. At this point the outermost part of the passage wall provides a wedging surface C which serves to limit radially outward movement of the ball 14 in the passage 13 relative to the axis A.

For the relatively unworn condition of that part of the nut engaging the shaft 12 as shown in FIG. 1 the ball 14 has only a loose interaction with the threaded shaft 12 being located in a direction parallel to the axis A by adjacent facing outer edges of the shaft thread. Any linear motion of the nut 11 occurs by interaction between the threads of the nut and those of the shaft. In this case a point on the shaft thread passes through the nut 11 on a helical path.

When a substantial degree of wear has occurred the relative disposition of the parts arises as is shown in FIG. 2. The inner portion of the nut 11 has worn to the extent that any further rotation of the threaded shaft 12 relative to nut 11 results in the nut 11 falling relative to the shaft 12. In this situation without the effect of ball 14 free relative linear motion of the nut relative to the shaft could occur and a point on the nut 11 would pass over the shaft in a straight line. In this event the linear movement of the nut 11 is not governed by rotation of the shaft 12 and the ball 14 is driven radially inwardly by wedging surface C to engage and thereafter to be retained in a thread as shown by the thrust imposed on the ball by surface C. The engagement prevents further free linear movement of the nut 11 relative to the shaft 12. The free relative movement that occurs is extremely small so that anyone being lifted or lowered by way of the assembly is not subject to violent acceleration. It is envisaged that despite a considerable increase in winding resistance it will be possible to complete a manual raising or lowering operation with the ball serving to provide engagement between what is left of the nut 11 and the threaded shaft 12. However if for no other reason than to prevent wearing of the thread form of the shaft by the hardened ball 13 it is necessary for the worn nut to be replaced promptly.

While an acme thread is referred to the embodiment of the invention is not limited to assemblies making use of that particular thread form. In an alternative helically interacting arrangement a recirculating ball bearing system is used. In this case the shaft and nut are provided with helical grooves of complementary semi-circular shape leaving a helical channel between the shaft and nut of circular cross section. Motion is transmitted from the shaft to the nut by using an intermediate means in this case a series of bearing balls which pass around a closed loop of which part is formed by the otherwise empty helical channel between shaft and nut. In this case the ball bearings form an intermediate driving means for the nut. In the event of the bearing balls being lost from the closed loop the nut and shaft can no longer interact. Unrestrained free relative motion of the nut relative to the shaft is prevented by a similar detent arrangement to that shown in connection with FIGS. 1 and 2.

Figure 3:
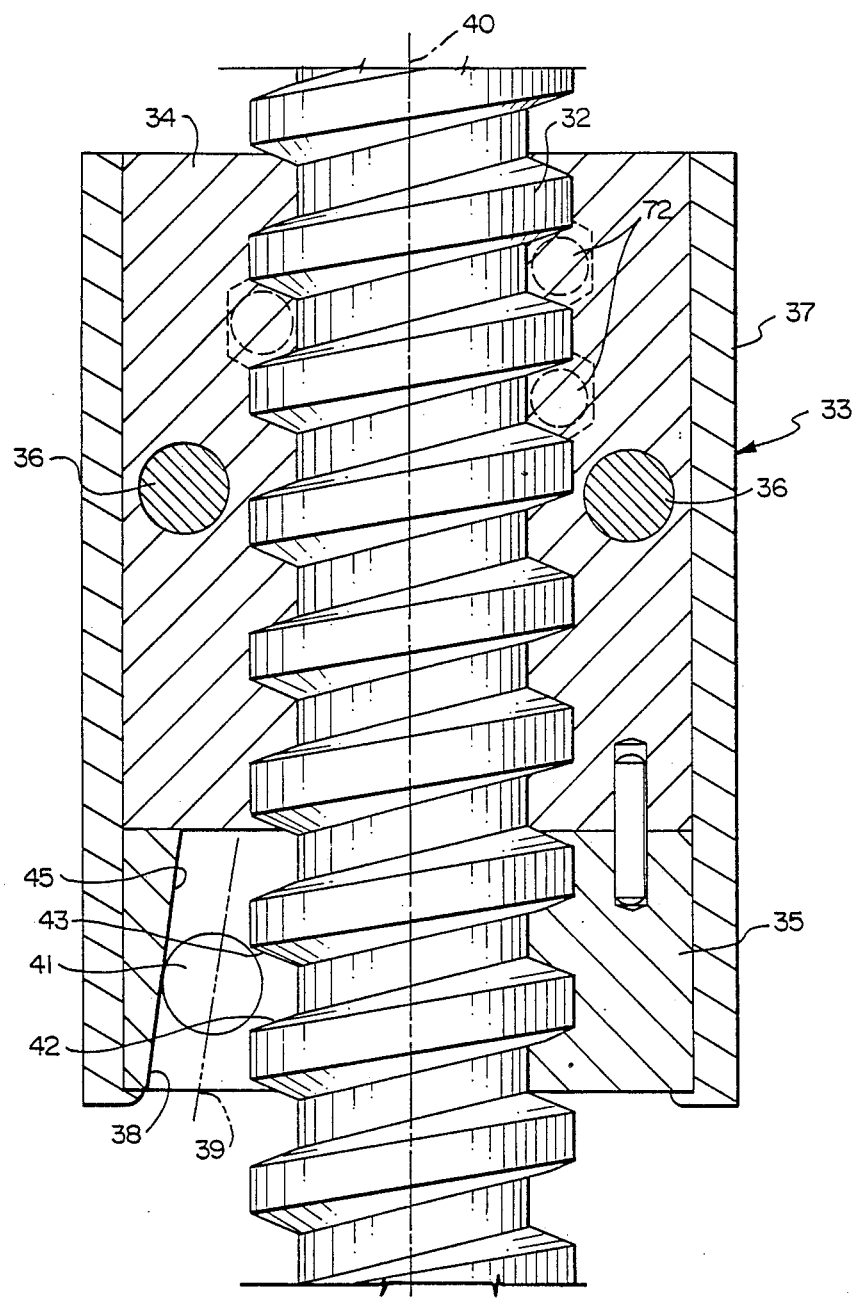
FIG. 3 is a longitudinal section of a second embodiment of a shaft and nut assembly.

FIG. 3 shows a screw and nut assembly 31 having a screw 32 similar in form and function to shaft 12 of FIGS. 1 and 2 and a nut 33 made up of parts 34, 35. Part 34 is a fabrication of graphite loaded nylon secured by pins 36 in a square section housing 37 in which is also located second part 35. The part 35 contains a passage 38 with axis 39 inclined at an angle of about 8 degrees to longitudinal axis 40 of the assembly 31. The passage 38 contains a detent ball 41 which floats relatively freely: in the direction of axis 40 between adjacent thread outer edges 42, 43 of screw 32; and in a direction diametrically transverse the axis 40 between wedging surface 45 of passage 38 and the currently adjacent part of screw 32. The part 35 is of steel to provide passage 38 with a rigid wall for the wedging surface 45. The graphite loaded material used for part 34 would not be appropriate for the wall of a passage having to provide a wedging surface comparable with surface 45.

The assembly 31 operates in a similar manner to that described in connection with FIGS. 1 and 2 in the event of the nut 33 and screw 32 ceasing to engage with their normal helical interaction. The use of a lubricant loaded plastics nut cuts down wear rates by comparison with unlubricated or irregularly lubricated metals.

FIG. 3 shows, in ghost, the plurality of intermediate discrete members 72, i.e., balls, for providing indirect interaction between the complementary threaded portions.

Figure 4:
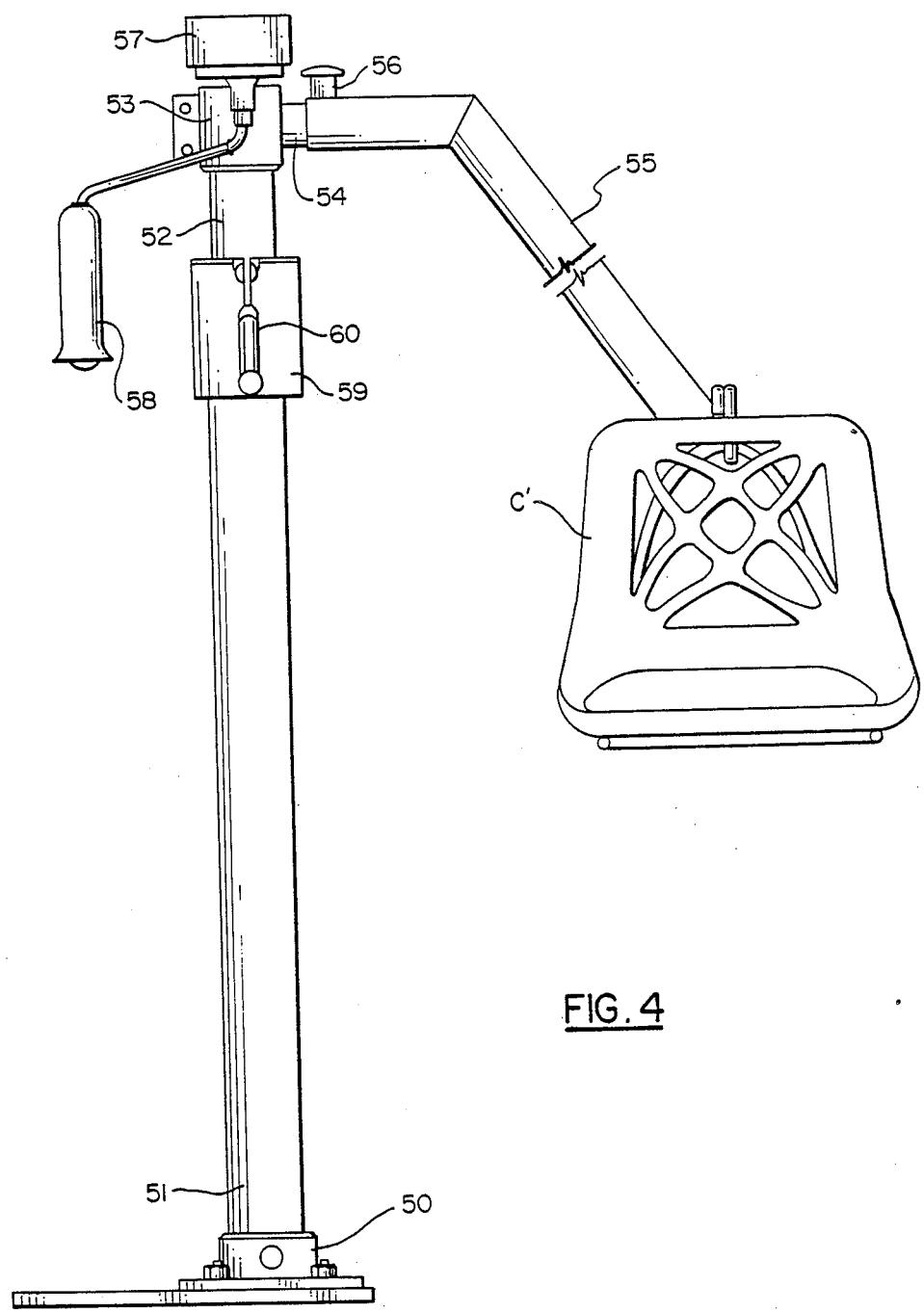
FIGS. 4 and 5 are perspective views of a lifting device incorporating a screw and nut assembly of the types described in connection with FIG. 3 however, in FIG. 5 the support arm and chair are not shown for clarification purposes.
Figure 5:
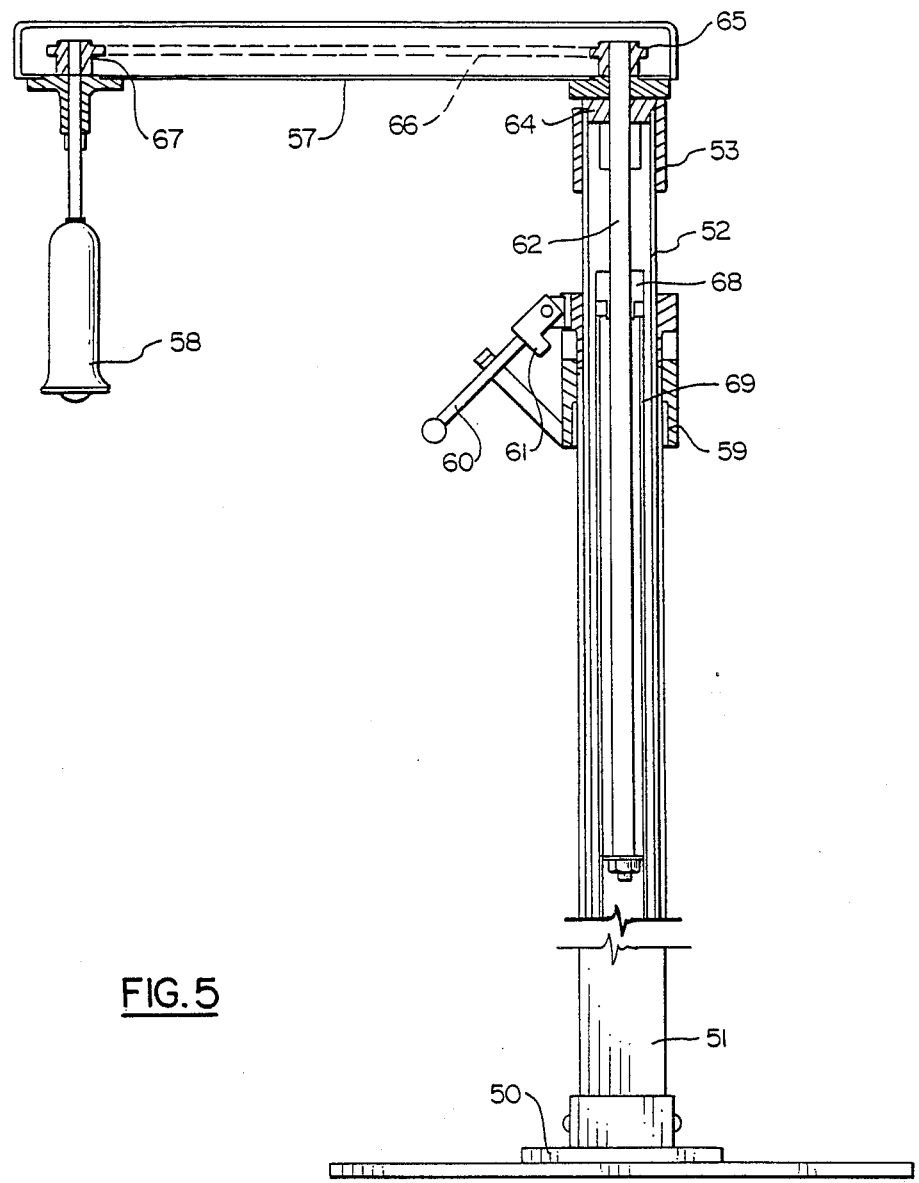

FIGS. 4 and 5 show a lifting device for an invalid. Base 50 has a column 51 secured to it. The column 51 houses a telescopic section tube 52. Upper end 53 of the tube 52 has stub arm 54 extending from it to which carrier arm 55 is demountably secured by way of retaining pin 56. The carrier arm 55 supports a chair C' at its outer end.

The top of tube 52 carries a housing 57, disposed at right angles to the stub arm 54, on which is rotatably mounted handle 58 whereby the height of the tube 52 relative to the column 51 can be varied as will be herein after described. The upper end of the column 51 has a sleeve 59 with a pivoted handle 60 having a protecting tooth 61. The tooth serves to engage a selected slot in the column 51 so positively securing the tube 52 against rotation relative to the column 51.

Referring now to FIG. 5. The tube 52 has rotatably mounted within it a shaft 62 with a threaded exterior which extends through cap 64 and into the interior of housing 57. Within the housing 57 the shaft 62 has locked to it a toothed cog 65 which is coupled by belt 66 to a similar cog 67 which is rotated by handle 58.

The shaft 62 helically engages a nut 68 mounted on the upper end of a tube 69 whose lower end is secured to the base 50. The nut 68 and shaft 62 are identical in form and function to nut 33 and screw 32 described in connection with FIG. 3.

In use a person seated in chair C' operates the handle 58 to rotate the shaft 62 and so raise or lower the tube 52. The chair C' and handle 58 are disposed in a constant relationship to each other.

When a substantial degree of wear of nut 68 has occurred relative to shaft 62 any further rotation of the shaft relative to nut (68) results in the shaft 62 falling relative to the nut 68. In this situation the linear movement of the nut 11 is no longer governed by rotation of the shaft. As described in connection with FIGS. 1 and 2 the nut contains a detent in the form of a ball which is driven radially inwardly by a wedging surface to engage and thereafter to be retained in a thread of shaft 62. The engagement prevents further free linear movement of the shaft 62 relative to the nut 68. The free relative movement that occurs is extremely small so that anyone in chair C' being raised or lowered or who are raising or lowering themselves by way of handle 58 are not subject to violent acceleration. It is envisaged that despite a considerable increase in winding resistance which will be immediately apparent to anybody operating handle 58 following nut failure it will still be possible to complete a manual raising or lowering operation with the ball serving to provide engagement between what is left of the nut 68 and the shaft 62. However if for no other reason than to prevent wearing of the thread form of the shaft by the hardened ball 13 it is necessary for the worn nut to be replaced promptly.

What is claimed:

1. A normally helically interacting shaft and nut having a common longitudinal axis along which the nut can be displaced linearly by rotation of the shaft; characterised by the nut having a passage including a wedging surface inclined at an angle to the longitudinal axis and facing into an aperture in the nut normally partially occupied by a threaded portion of the shaft; and a detent located in the passage, the detent normally being loosely located in a direction parallel to the longitudinal axis by way of threads on the shaft and in a direction transverse the axis and radially furthest therefrom by the wedging surface and radially nearest thereto by the shaft.

2. A shaft and nut assembly as claimed in claim 1 wherein the normal helical interaction is provided by complementary threaded portions provided on the nut and on the shaft which portions are in sliding contact with one another.

3. A shaft and nut as claimed in claim 1 wherein a normal helical interaction is provided by complementary threaded portions provided on the nut and on the shaft which portions engage one another indirectly by way of at least one intermediate discrete member.

4. A shaft and nut assembly as claimed in claim 1 wherein the nut is in two discrete but connected parts; the first part containing at least some of the complementary threaded portion of the nut and the second part containing the wedging surface and detent.

5. A shaft and nut as claimed in claim 4 wherein the first part of the nut, or at least the complementary threaded portion of it, is of a self lubricating material.

6. A shaft and nut as claimed in claim 5, wherein the self lubricating material is a graphite loaded plastics material.

7. A normal helically interacting shaft and nut having a common longitudinal axis along which the nut can be displaced linearly by rotation of the shaft; characterized by the nut having a passage extending therethrough, a part of the passage having a wedging surface inclined at an angle to the longitudinal axis and facing towards an aperture in the nut normally partially occupied by a threaded portion of the shaft; and a normal unattached detent housed in the passage and limited in movement relative to the axis in a direction parallel to the axis, and in a direction transverse the axis and radially nearest thereto, by way of threads on the shaft in the aperture; in a direction transverse the axis and radially furthest therefrom by the wedging surface wherein the detent is a ball.

8. For a normally helically interacting shaft and nut having a common longitudinal axis along which the nut can be displaced linearly by rotation of the shaft a method of limiting free linear motion of the nut relative to the shaft comprising the steps of:

(a) providing a passage including a wedging surface in the nut at least the surface being inclined at an angle to the longitudinal axis and opening into a space normally partially occupied by a portion of the threaded shaft;

(b) providing the direction of the longitudinal axis by way of the direction of the longitudinal axis by way of the shaft; and radially in a direction transverse the longitudinal axis outwardly by the wedging surface and inwardly by the shaft; and, in the event of free relative linear motion by the nut relative to the threaded shaft;

(c) causing the surface to displace the detent towards, and into engagement with, the threaded shaft so engaging the nut with the threaded shaft and thereafter, for as long as a force acts to displace the nut linearly relative to the shaft;

(d) maintaining the detent in engagement with the shaft to inhibit further free linear motion of the nut relative to the shaft.

* * * * *

UNITED STATES PATENT AND TRADEMARK OFFICE
CERTIFICATE OF CORRECTION

PATENT NO. : 4,962,674

DATED : October 16, 1990

INVENTOR(S) : John Charles PAYNE

It is certified that error appears in the above-identified patent and that said Letters Patent is hereby corrected as shown below:

Col. 5, line 18 cancel "assembly";

line 28 cancel "assembly".

Col. 6, line 24 after "providing" insert --a detent in the passage loosely located: in--.

Col. 6, line 25 and 26, delete "direction of the longitudinal axis by way of the".

Signed and Sealed this

Fifth Day of May, 1992

*Attest:*

DOUGLAS B. COMER

*Attesting Officer*   *Acting Commissioner of Patents and Trademarks*